Sept. 27, 1955     O. W. NITZ     2,718,812

PHOTOGRAPHIC ENLARGEMENT EASEL

Filed Aug. 31, 1951     2 Sheets-Sheet 1

Otto W. Nitz
*INVENTOR.*

BY Clarence A. O'Brien
and Harvey B. Jacobson
*Attorneys*

Sept. 27, 1955     O. W. NITZ     2,718,812
PHOTOGRAPHIC ENLARGEMENT EASEL
Filed Aug. 31, 1951     2 Sheets-Sheet 2
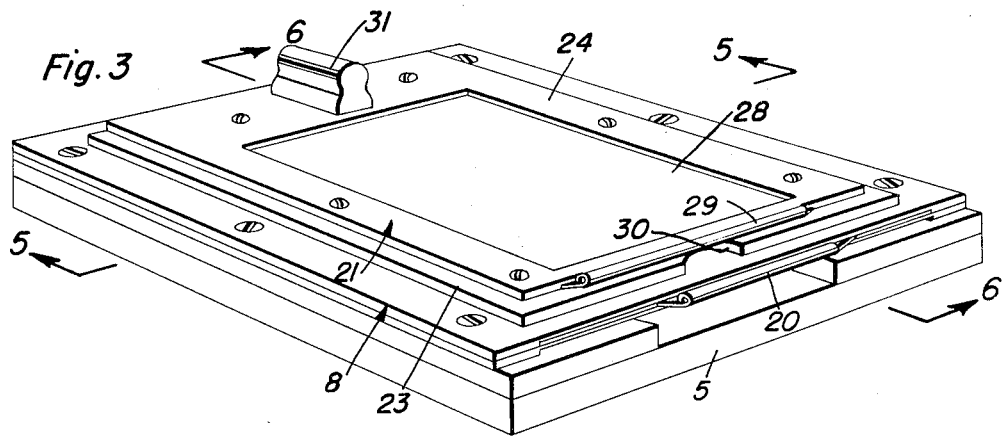
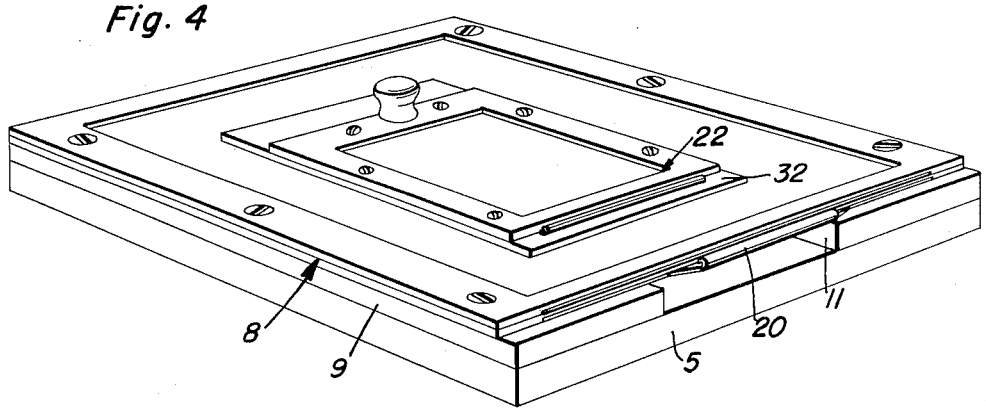
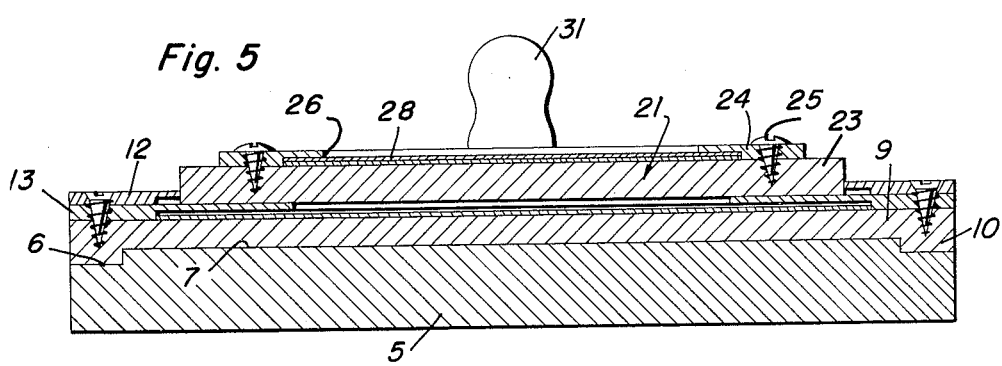
Otto W. Nitz
INVENTOR.

United States Patent Office 2,718,812
Patented Sept. 27, 1955

2,718,812

PHOTOGRAPHIC ENLARGEMENT EASEL

Otto W. Nitz, Havre, Mont.

Application August 31, 1951, Serial No. 244,596

2 Claims. (Cl. 88—24)

The present invention relates to new and useful improvements in frames or easels for holding sensitized paper for projection thereon of enlargements from photographic negatives.

An important object of the invention is to provide a frame or easel of this character adapted for receiving a focusing slide on which a picture has been composed and alined, together with a holding unit for the frame or easel and wherein the frame or easel may be conveniently handled during removal of the slide and insertion of the sensitized paper and replaced in the holding unit in exactly its original position.

Another object is to provide an apparatus of this character of simple and practical construction, which is efficient and reliable in operation, relatively inexpensive to manufacture and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a perspective view showing one of the adaptor frames or easels in the main frame or easel;

Figure 4 is a similar view showing another adaptor frame or easel in the main frame or easel;

Figure 5 is a transverse sectional view taken on a line 5—5 of Figure 3; and,

Figure 1:
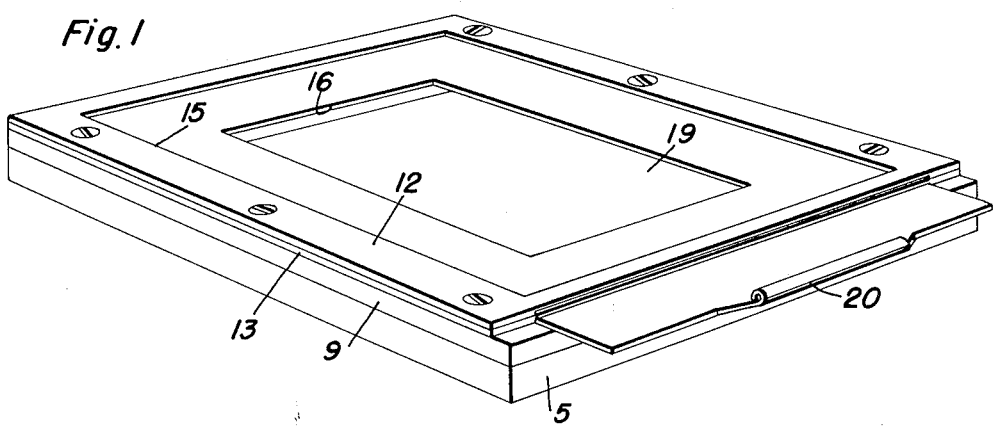
Figure 1 is a perspective view of the main frame or easel showing the focusing slide in its lower position.
Figure 2:
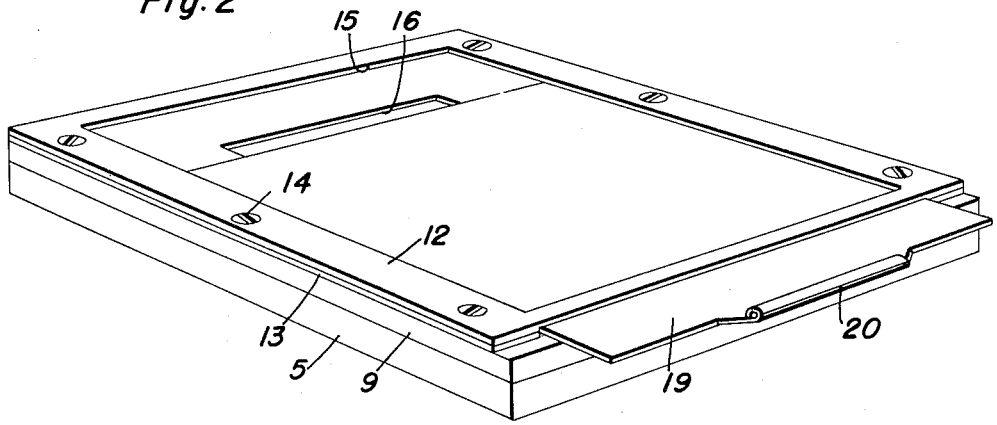
Figure 2 is a similar view showing the focusing slide in its upper position.

Referring now to the drawings in detail, wherein for the purpose of illustration I have disclosed a preferred embodiment of my invention, the numeral 5 designates a flat main base of rectangular shape and having a rabbeted edge 6 to form an island 7 on top of the base and with the marginal edges of the island inwardly of the marginal edges of the base.

A main frame or easel is designated generally at 8 and comprises a lower supplemental base 9 co-extensive with base 5 and having a marginal strip 10 at its underside to seat on the rabbeted edge 6 of the main base to hold the supplemental base 9 from sliding movement thereon. The front end of supplemental base 9 is formed with a finger receiving notch 11.

Figure 6:
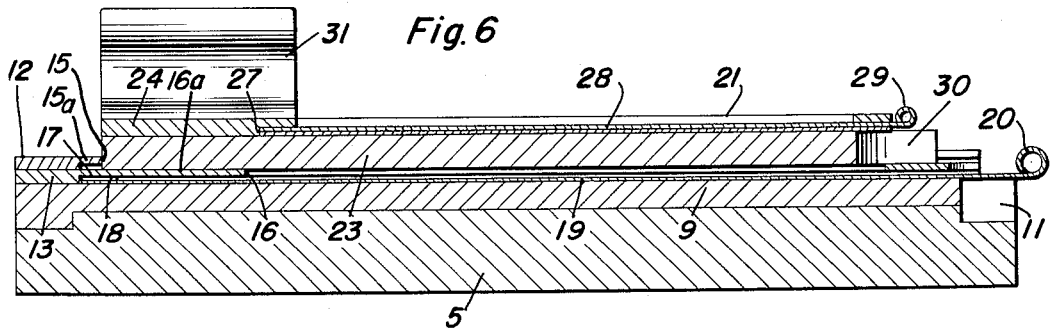
Figure 6 is a longitudinal sectional view taken on a line 6—6 of Figure 3.

Co-extensive upper and lower frame members 12 and 13 are secured in superposed relation on top of supplemental base 9 by screws 14, upper frame member 12 having a central opening 15 and lower frame member 13 having a central opening 16 of an area less than that of opening 15 to form mat or margin forming masking frames 15a, 16a of different areas. The underside of masking frame 15a of upper frame 12 is formed with an undercut kerf or slot 17 and the underside of masking frame 16a of lower frame 13 is also formed with an undercut kerf or slot 18, slots 17 and 18 being coextensive in area, as shown in Figures 5 and 6, and both slots are open at the front edges of the upper and lower frames to selectively receive a sheet metal focusing slide 19 having a rolled finger gripping edge or handle 20.

Auxiliary frames are shown at 21 and 22, frame 21 including a base 23 co-extensive with opening 15, to closely fit therein, and an upper frame 24 secured to base 23 by screws 25 and having a central opening 26. Frame 24 is formed at its underside with an undercut kerf or slot 27 at the opening 26 and which is open at the front edge of frame 24 to receive a sheet metal focusing slide 28 which is also formed at its outer edge with a rolled finger grip or handle 29. Base 23 is formed at its front edge with a finger receiving notch 30 and a handle 31 rises from the rear of frame 24 to lift the frame 21 from frame 8.

Auxiliary frame 22 is constructed similar to frame 21 except that base 32 thereof is co-extensive in area to opening 16 of main frame 8 to closely fit therein.

The invention is used by placing the easel under an enlarger and with a selected frame 8, 21 or 22 in position, so that the projected image falls on the focusing slide of the selected size frame. The image is properly focused and aligned to achieve the desired picture composition and the enlarger light is then turned out and the frame is lifted off without disturbing the position of its supporting base and the focusing slide is removed and replaced with a sheet of sensitized paper. The frame is then put back on its supporting base and the image projected on the paper.

The focusing slide is used since there may be a black non-reflecting surface under the sensitized paper during projection, thus eliminating slight loss of contrast in the finished print as a result of passage of light through the paper with subsequent diffusion and reflection back to the sensitized emulsion. In making more than one copy of the same picture the image need be focused on the slide only once as the supporting base will remain in its set position.

The provision of separate paper holding frames or units which may be lifted off and restored to the same position enables composition and alignment on the focusing slide of the selected picture size, then in relative darkness the frame can be readily removed and handled to take out the slide and insert the sensitized paper; following which the unit can be returned to its position on the base and the projection made exactly as previously aligned on the focusing slide.

Upper and lower frames 12 and 13 provide picture openings 15 and 16 having margin forming masking frames of different areas to produce either wide or narrow margins around the print to produce the effect of a mat mounting.

Having described the invention, what is claimed as new is:

1. A photographic enlarging easel comprising a base, a frame adapted to rest on the base, means carried by one and engaging the other to lock the frame on the base from relative sliding movement, said frame having upper and lower registering openings of different sizes, elevated masking frames of varying width at the perimeter of said openings and adapted to receive sensitized sheets placed selectively under the masking frames to produce margins corresponding in width to the masking frames for pictures printed on the sheets, and a second base fitting in at least one of said openings and having thereon a second frame with undercut internal edges confining a focusing slide on said second base.

2. A photographic enlarging easel comprising a solid flat base, a frame resting on said base and including a second solid flat base, means on said bases coacting to lock said bases together against relative sliding movement, a pair of superposed masking frames on said second base with registering openings of different sizes, said frames being undercut around said openings to receive sensitized sheets of different sizes placed in the frames, and a third base fitting in at least one of the openings and carrying a frame having undercut internal edges confining a focusing slide on said third base.

References Cited in the file of this patent

UNITED STATES PATENTS

| | | |
|---|---|---|
| 1,249,172 | Mullendore | Dec. 4, 1917 |
| 2,213,313 | Hill | Sept. 3, 1940 |
| 2,335,189 | Mayer | Nov. 23, 1943 |
| 2,432,040 | Raiff | Dec. 2, 1947 |